C. V. AMENT.
HEN'S NEST.
No. 10,675.  Patented Mar. 21, 1854.
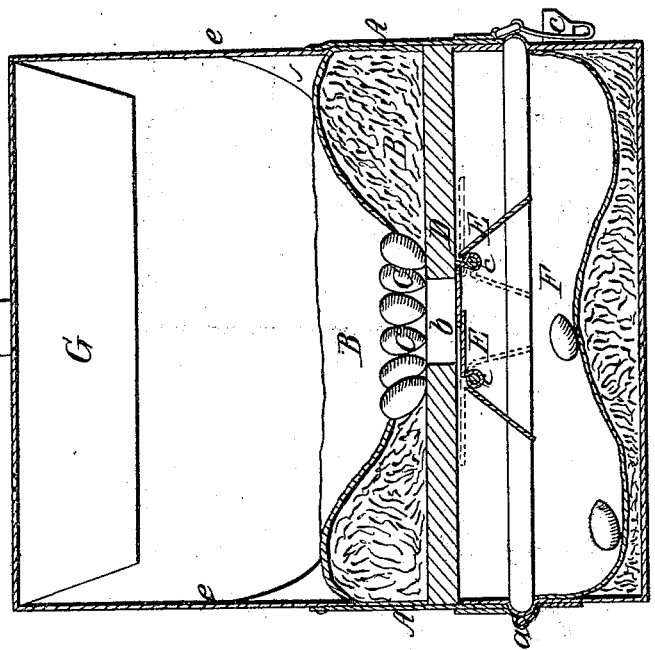
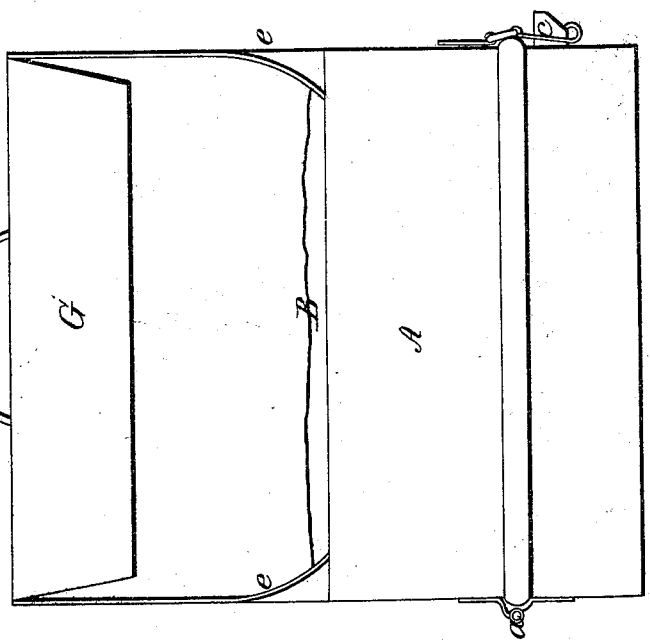

UNITED STATES PATENT OFFICE.

C. V. AMENT, OF DANSVILLE, NEW YORK.

DEVICE FOR PRESERVING HENS' EGGS IN THE NEST.

Specification of Letters Patent No. 10,675, dated March 21, 1854.

*To all whom it may concern:*

Be it known that I, C. V. AMENT, of Dansville, in the county of Livingston and State of New York, have invented a new and useful Hen's Nest; and I do hereby declare that the following is a full, clear, and exact description of the same, reference being had to the accompanying drawings, forming part of this specification, in which—

Figure 1, is an external elevation of one of my improved nests. Fig. 2, is a vertical central section of the same.

Similar letters of reference in each of the two figures, indicate corresponding parts.

The nature of my invention consists in constructing the nest with two chambers, which communicate with each other, through a hole in the center of the nest, and a false bottom or self adjusting valves under the same—the upper chamber being provided with a suitable nest, and a number of false eggs for the hen to set upon while laying, and the bottom one provided with a soft cushioned surface for the eggs to fall upon—which is made of such shape that the real eggs, as they are laid and escape through the valve, are caused to roll toward the edge of the bottom, and remain there, until it is desired to remove them.

This nest presents manifold advantages over the ordinary kinds: 1st, it prevents the loss of eggs by hens setting upon them; 2d, it secures them from weasels, cats., &c.; 3d, it saves the trouble of gathering them daily; 4th, the eggs can be kept free from the cold; and consequently, be prevented from freezing in winter.

To enable others to understand more freely, my invention, I will proceed to describe its construction more minutely.

A, represents the upper chamber, in which the nest, B, and false eggs, C, are placed, as shown in Fig. 2. This chamber has a bottom, D,—in the center of which, and also in the center of the nest resting on the same, a hole, b, is formed, for the real eggs to pass through as soon as they are laid. This hole is covered by self adjusting or balancing valves, E, E, which are arranged under the same, and turn on centers, c, c, as seen in Fig. 2.

F, is the lower chamber, into which the eggs fall as they are laid. This chamber is cushioned or made soft in its inside; its bottom is made highest in its center and sloping toward its edges; so that the eggs may all have a gradual movement from the center to the edge, and consequently, prevented from falling directly upon one another as they come into the lower chamber. The top and lower chambers are hinged together at, a, and may be secured fast by the catch, c, until it is desired to remove the eggs from the lower chamber.

The nest is guarded from injury by a shed or guard, G, which is open at two sides. This shed is placed over, and a short distance above, the nest—it being sustained by the vertical side pieces, e, e.

The operation of this nest is as follows:— The hen is induced to sit upon the nest by reason of the false eggs being placed in it. As soon as she lays an egg, it passes through the hole, b, and falls upon the valves, E, E, and causes them instantly to fly open, and allow the egg to pass into the lower chamber, as shown in Fig. 2,—the valves assuming the position shown in red lines in same figure, until the egg escapes, and then adjusting themselves automatically, as will be evident from Fig. 2,—one end of said valves being heavier than that of the other; and consequently, the lightest ends which come over the hole are always thrown horizontal when not resisted by the weight of the egg. By examining Fig. 2, the manner in which the real eggs are caused to roll toward the edge from the inclined center will be clearly seen—one egg being shown in the act of rolling from the center, while another is represented as already being in its proper place.

To remove the real eggs, it is necessary to unfasten the catch, c, and raise the top chamber, A, and throw it back,—on its hinge, a.

What I claim as my invention, and desire to secure by Letters Patent, is:—

Constructing a hen's nest with two peculiarly constructed and arranged chambers, A, F, which communicate with each other through a hole, a, in the center of the nest and self adjusting false bottom under the same—the upper chamber, A, being provided with a suitable nest, and a number of false eggs, C, for the hen to sit upon; and the lower one, F, is provided with a soft cushioned surface for the eggs to fall upon—which is made of such shape that the real eggs, as they escape through the false bottom, are caused to roll gradually toward the edge of the bottom, and remain there until removed. The whole being constructed and arranged in the manner, and for the purposes herein described and set forth.

C. V. AMENT.

Witnesses:
   I. BROCKWAY,
   N. B. AMENT.